(12) United States Patent
Schulze

(10) Patent No.: US 8,505,672 B2
(45) Date of Patent: Aug. 13, 2013

(54) UNDERBODY INTEGRATED EXHAUST PATH FOR FUEL CELL VEHICLES

(75) Inventor: Jörg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 13/214,777

(22) Filed: Aug. 22, 2011

(65) Prior Publication Data

US 2013/0048408 A1    Feb. 28, 2013

(51) Int. Cl.
*B60K 13/04* (2006.01)

(52) U.S. Cl.
USPC .................................................. 180/309

(58) Field of Classification Search
USPC ............... 180/390, 68.5; 138/118.1, 124, 138/133–134; 429/34
See application file for complete search history.

(56) References Cited

U.S. PATENT DOCUMENTS 3,084,971 A * 4/1963 Schilberg ...................... 296/35.1
3,135,347 A * 6/1964 Vranyosovics ................ 180/296

* cited by examiner

*Primary Examiner* — John Walters
*Assistant Examiner* — James Triggs
(74) *Attorney, Agent, or Firm* — Fraser Clemens Martin & Miller LLC; J. Douglas Miller

(57) ABSTRACT

A fuel cell vehicle is provided with a temperature tolerant exhaust system that eliminates the need for exhaust pipes, pipe routing, support systems, and ground clearance issues. The exhaust system includes a fuel cell exhaust pipe in fluid communication with a fuel cell stack and an exhaust tube. The exhaust tube is supported within an exhaust channel that extends along and forms a part of the underbody of the fuel cell vehicle. Alternatively, the exhaust tube is formed within the interior of the exhaust channel.

20 Claims, 3 Drawing Sheets

UNDERBODY INTEGRATED EXHAUST PATH FOR FUEL CELL VEHICLES

FIELD OF THE INVENTION

This invention relates to a fuel cell system and, more particularly, to a fuel cell exhaust path and components thereof.

BACKGROUND OF THE INVENTION

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A (PEM) Proton Exchange Membrane fuel cell employs a solid polymer as an electrolyte membrane in a commonly adopted fuel cell. In this type of fuel cell vehicle, power generation is carried out by the electrochemical reaction between air and hydrogen within the fuel cell. A hydrogen fuel cell is an electro-chemical device that includes an anode and a cathode with an electrolyte disposed therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus, are directed through a load to perform work before being sent to the cathode. The work acts to operate the vehicle.

Many fuel cells are typically combined in a fuel cell stack to generate the desired power for the vehicle. The fuel cell stack receives a cathode input gas as a flow of air, typically forced through the stack by a compressor. Not all of the oxygen in the air is consumed by the stack, and some of the air is outputted as a cathode exhaust gas that may include water as a stack by-product. The air not used for the power generation is externally exhausted through an exhaust pipe together with water created by the electrochemical reaction. Further, since the fuel cell is supplied with high pressure air, the high pressure exhaust gas flows through the exhaust pipe.

PEM fuel cells operate at low temperatures. Ambient pressure designs operate near 80° C. This level is much lower than the over 2000° C. flame temperature and roughly 500° C. exhaust gas temperature of a gasoline combustion engine. Pressurized PEM fuel cells use only relatively low pressures, so temperatures are under 200° C. Some of this heat is carried away in the exhaust stream.

The components of a fuel cell vehicle exhaust system may include a fuel cell stack exhaust pipe attached to a fuel cell stack, such as the hydrogen PEM fuel cell described above. The fuel cell exhaust pipe acts as a conduit between the fuel cell stack and the fuel cell exhaust system. The fuel cell exhaust travels from the fuel cell stack through the exhaust pipe to additional components such as an air diffuser and the exhaust tubes into the atmosphere. The support structure for the exhaust system includes a pipe for routing the exhaust and a series of hangers for supporting the pipe. Ground clearance of the hanging pipe is a design consideration along with exhaust noise and general exposure of the exhaust system to the atmosphere.

It would be desirable to provide a temperature tolerant exhaust system that eliminates the need for exhaust pipes, pipe routing, support systems, and ground clearance issues.

SUMMARY OF THE INVENTION

Concordant and congruous with the present invention, an underbody integrated exhaust path for fuel cell vehicles has surprisingly been discovered. In one embodiment, a fuel cell vehicle exhaust system comprises an exhaust pipe having a first end and a second end, wherein the first end of exhaust pipe is in fluid communication with the fuel cell stack; an exhaust tube in fluid communication with the second end of the exhaust pipe; and an exhaust channel extending along the length of the exhaust tube and securing the exhaust tube to an underbody of the fuel cell vehicle and configured to guide an exhaust vapor from the fuel cell vehicle to exit the exhaust tube into the atmosphere.

In another embodiment, a fuel cell vehicle exhaust system comprises an exhaust pipe having a first end and a second end, wherein the first end of the exhaust pipe is in fluid communication with the fuel cell stack; and an exhaust channel in fluid communication with the second end of the exhaust pipe and secured to an underbody of the fuel cell vehicle; the exhaust channel configured to guide an exhaust vapor from the fuel cell vehicle to exit the exhaust channel into the atmosphere.

In another embodiment, a fuel cell vehicle exhaust system comprises an exhaust pipe having a first end and a second end, wherein the first end of the exhaust pipe is in fluid communication with the fuel cell stack; and an exhaust channel in fluid communication with the second end of the exhaust pipe and secured to an underbody of the fuel cell vehicle and further comprises a sealed chamber forming an exhaust tube; the exhaust channel configured to guide an exhaust vapor from the fuel cell vehicle to exit the exhaust channel into the atmosphere.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
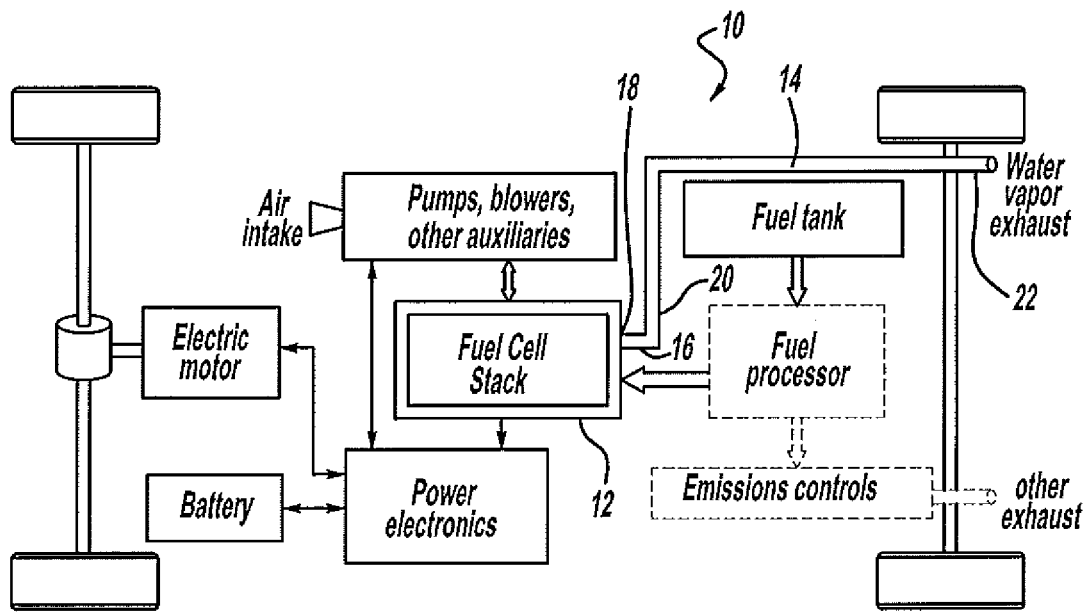
FIG. 1 illustrates a schematic diagram of a fuel cell system including an exhaust system of a fuel cell vehicle according to an embodiment of the invention.

FIG. 1 shows a schematic diagram of a typical fuel cell vehicle 10. The fuel cell vehicle 10 includes a fuel cell stack 12, such as a (PEM) Proton Exchange Membrane fuel cell, and an exhaust system 14 extending from the fuel cell stack 12.

Figure 2:
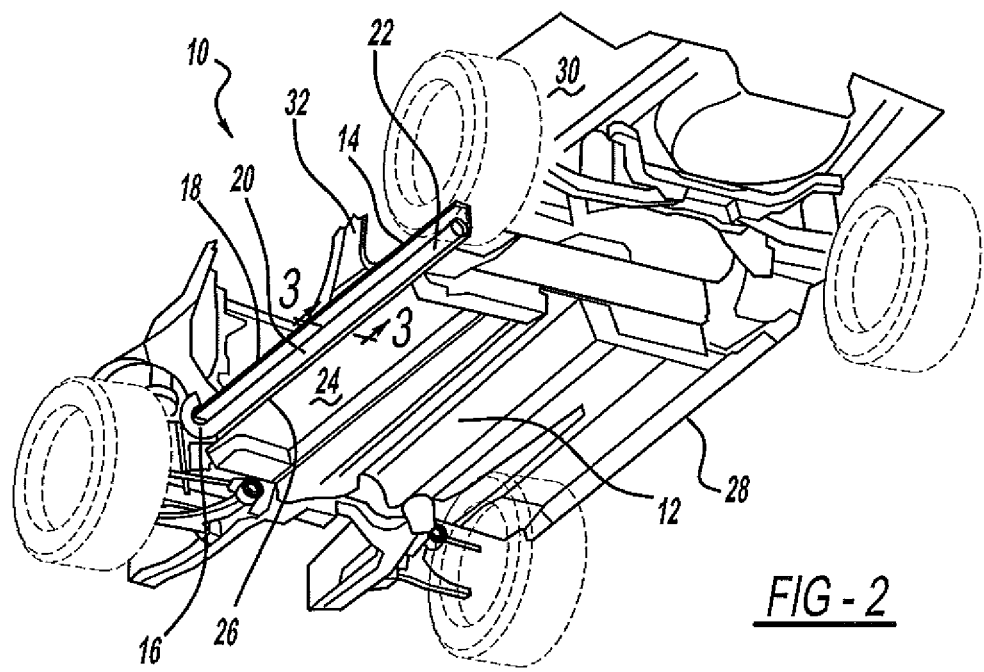
FIG. 2 illustrates a rear perspective view of the underbody of the fuel cell vehicle including an embodiment of the exhaust system of the present invention.

In a first embodiment of the present invention shown with reference to FIGS. 1 and 2, the exhaust system 14 of the fuel cell vehicle 10 includes a fuel cell exhaust pipe 16 in fluid communication with a fuel cell stack 12 at a first end 18 and an exhaust tube 22 at a second end 20. In one embodiment, the exhaust pipe 16 may be formed of a flexible material, such as rubber hosing or molded plastic to eliminate excess weight of the exhaust system 14. Materials such as rubber or plastic may be used because they are generally temperature resistant and the temperature of the exhaust vapor for a PEM fuel cell operates at low temperatures, where ambient pressure designs operate near 80° C. This level is much lower than the over 2000° C. flame temperature and roughly 500° C. exhaust gas temperature of a gasoline combustion engine. A pressurized PEM fuel cell uses only relatively low pressures, so temperatures are under 200° C. The fuel exhaust pipe 16 is typically sealed to the exhaust tube 22.

The exhaust tube 22 is supported within an exhaust channel 26 that extends along the underbody 24 of the vehicle 10. The exhaust channel 26 is typically formed of sheet metal, although other materials can be used. The sheet metal gauge is dependent on the grade of material and the forming process of the exhaust channel 26 where the channel 26 may be formed by bending, deep drawing, punching, spinning, stamping, press brake, or roll forming, for example. The exhaust channel 26 extends the length of the exhaust tube 22. The exhaust tube 22 may be fixed to the exhaust channel 26 by means such as spot welding. The exhaust channel 26 extends along and forms a part of the underbody 24. The exhaust channel 26 may be formed by any sheet metal parts of the fuel cell vehicle 10, such as the A-pillar, B-pillar, C-Pillar, all underbody regions or even integrated to the dash panel and/or roof parts. As illustrated in FIG. 2, the exhaust channel 26 is formed as part of the rocker panel 28 of the underbody 24, guiding the exhaust vapors to exit the exhaust tube 22 at the rear 30 of the fuel cell vehicle 10. In another embodiment, the exhaust channel 26 may be formed as part of the C pillar 32, guiding the exhaust vapors to exit the exhaust tube 22 at the rear 30 of the vehicle 10 into the atmosphere.

Figure 3:
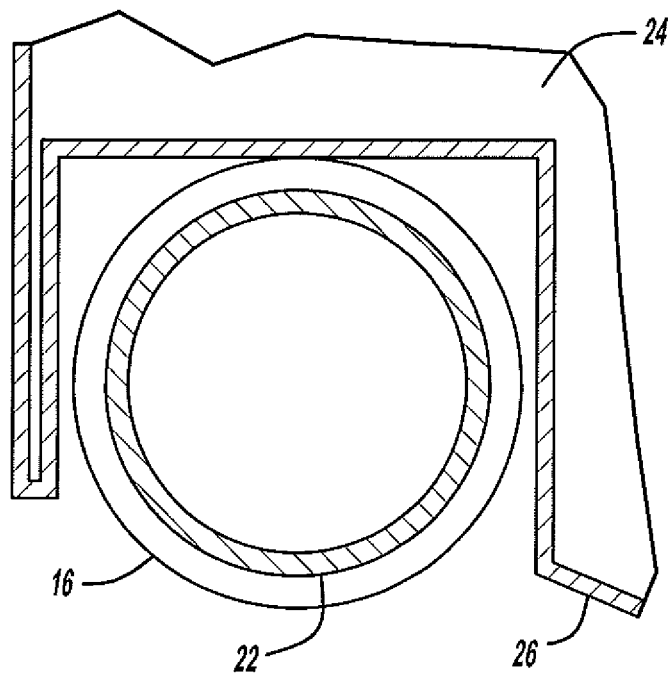
FIG. 3 illustrates a cross-sectional view of the exhaust system of FIG. 2 taken along line 3-3.

FIG. 3 illustrates a view of the exhaust channel 26 taken along line 3-3 of FIG. 2. The fuel cell exhaust pipe 16 is fixed to the exhaust tube 22, which in turn is fixed to the interior of the of the exhaust channel 26 by spot welding or the like.

Figure 4:
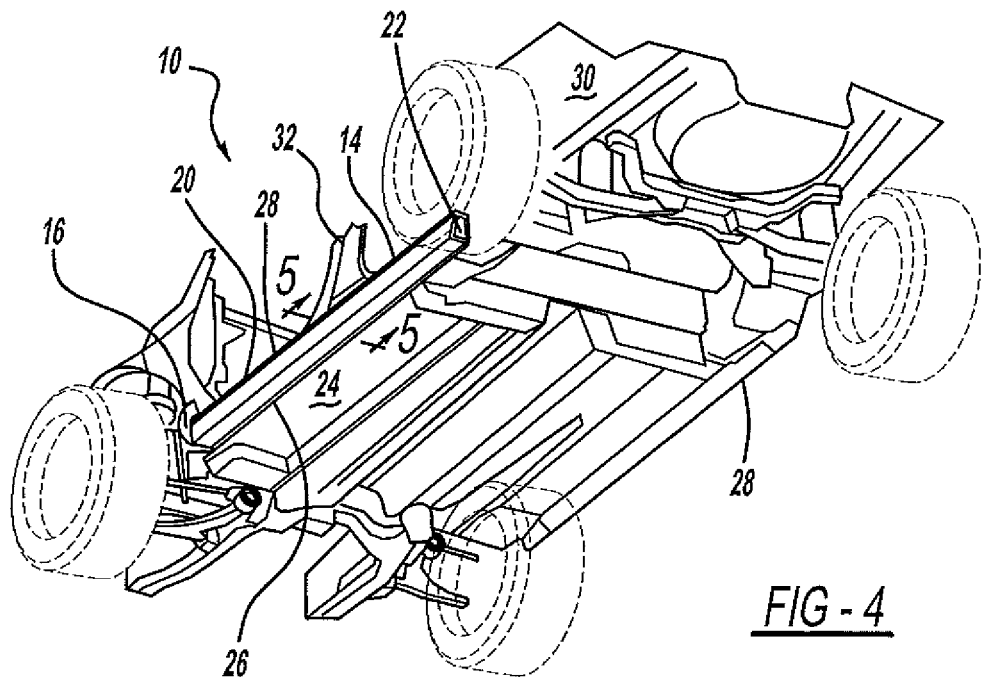
FIG. 4 illustrates a rear perspective view of the underbody of a fuel cell vehicle including another embodiment of an exhaust system of the present invention.

FIG. 4 illustrates another embodiment of the present invention and includes identical reference numerals for the identical parts described in FIGS. 1-3. The exhaust system 14 of a fuel cell vehicle 10 includes a fuel cell exhaust pipe 16 in fluid communication with a fuel cell stack 12 at a first end 18 and an exhaust channel 26 at a second end 20. In one embodiment, the exhaust pipe 16 may be formed of a flexible material, such as rubber hosing or molded plastic to eliminate excess weight of the exhaust system 14. Materials such as rubber or plastic may be used because they are generally temperature resistant and the temperature of the exhaust vapor for a PEM fuel cell operates at low temperatures, where ambient pressure designs operate near 80° C. This level is much lower than the over 2000° C. flame temperature and roughly 500° C. exhaust gas temperature of a gasoline combustion engine. A pressurized PEM fuel cell uses only relatively low pressures, so temperatures are under 200° C. The fuel exhaust pipe 16 is typically sealed to the exhaust channel 26.

Figure 5:
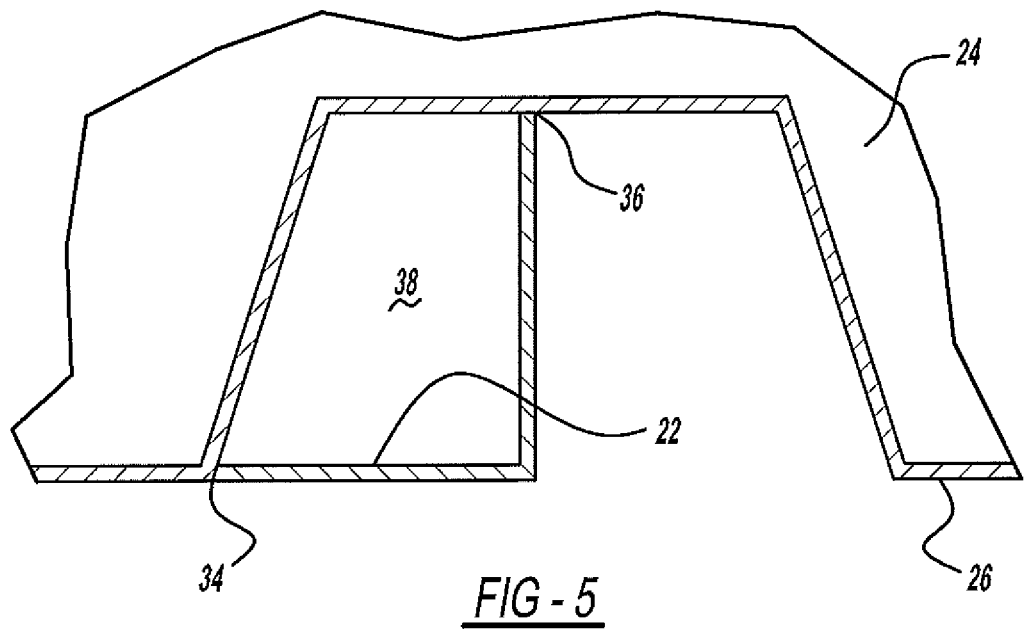
FIG. 5 illustrates a cross-sectional view of the exhaust system of FIG. 4 taken along line 5-5.

The exhaust channel 26 may be formed by any sheet metal parts of the fuel cell vehicle 10, such as the A-pillar, B-pillar, C-Pillar, all underbody regions or even integrated to the dash panel and/or roof parts. As illustrated in FIG. 4, the exhaust channel 26 may extend along the underbody 24 of the vehicle 10. The exhaust channel 26 may be formed of sheet metal and includes an exhaust tube 22 formed within the interior of the exhaust channel 26 as best illustrated in FIG. 5. The sheet metal gauge for the exhaust channel 26 and the exhaust tube 22 is dependent on the grade of material and the forming process where the channel 26 may be formed by bending, deep drawing, punching, spinning, stamping, press brake or roll forming, for example. The exhaust tube 22 extends the length of the exhaust channel 26 and is spot-welded to the exhaust channel 26 along the edges 34, 36 to form a sealed chamber 38. The chamber 38 may be of any shape or form such as a cylindrical tube or rectangular as shown, and may be attached to the exhaust channel by any means. The exhaust channel 26 may be formed as part of the rocker panel 28 of the underbody 24, guiding the exhaust vapors from the exhaust pipe 16 through the exhaust tube 22 to exit at the rear 30 of the fuel cell vehicle 10. In another embodiment, the exhaust channel 26 may be formed as part of the C pillar 32, guiding the exhaust vapors to exit the exhaust tube 22 at the rear 30 of the vehicle 10 into the atmosphere.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell vehicle exhaust system comprising:
an exhaust pipe having a first end and a second end, wherein the first end of the exhaust pipe is in fluid communication with the fuel cell stack;
an exhaust tube in fluid communication with the second end of the exhaust pipe; and
an exhaust channel extending along an entire length of the exhaust tube and securing the exhaust tube to the exhaust channel, the exhaust channel formed as part of an underbody of the fuel cell vehicle and configured to guide an exhaust vapor from the fuel cell vehicle to exit the exhaust tube into the atmosphere.

2. The fuel cell vehicle exhaust system of claim 1, wherein the exhaust channel is formed as a part of a rocker panel of the underbody of the fuel cell vehicle.

3. The fuel cell vehicle exhaust system of claim 1, wherein the exhaust channel is formed as a part of at least one of an A-pillar, a B-pillar and a C-pillar of the fuel cell vehicle.

4. The fuel cell vehicle exhaust system of claim 1, wherein the exhaust pipe is formed of a flexible material.

5. The fuel cell vehicle exhaust system of claim 1, wherein the exhaust pipe is sealed to the exhaust tube.

6. The fuel cell vehicle exhaust system of claim 1, wherein the exhaust channel is formed of sheet metal.

7. A fuel cell vehicle exhaust system comprising:
an exhaust pipe having a first end and a second end, wherein the first end of the exhaust pipe is in fluid communication with the fuel cell stack; and
an exhaust channel in fluid communication with the second end of the exhaust pipe and secured to and formed as part of an underbody of the fuel cell vehicle; the exhaust channel configured to guide an exhaust vapor from the fuel cell vehicle to exit the exhaust channel into the atmosphere.

8. The fuel cell vehicle exhaust system of claim 7, further comprising an exhaust tube formed within an interior of the exhaust channel, wherein a portion of the exhaust tube is formed from an interior surface of the exhaust channel.

9. The fuel cell vehicle exhaust system of claim 8, wherein the exhaust tube is a sealed chamber and extends along an entire length of the exhaust channel.

10. The fuel cell vehicle exhaust system of claim 7, wherein the exhaust channel is formed as a part of a rocker panel of the underbody of the fuel cell vehicle.

11. The fuel cell vehicle exhaust system of claim 7, wherein the exhaust channel is formed as a part of at least one of an A-pillar, a B-pillar and a C-pillar of the fuel cell vehicle.

12. The fuel cell vehicle exhaust system of claim 7, wherein the exhaust pipe is formed of a flexible material.

13. The fuel cell vehicle exhaust system of claim 7, wherein the exhaust pipe is sealed to the exhaust channel.

14. The fuel cell vehicle exhaust system of claim 7, wherein the exhaust channel is formed of sheet metal.

15. A fuel cell vehicle exhaust system comprising:
an exhaust pipe having a first end and a second end, wherein the first end of the exhaust pipe is in fluid communication with the fuel cell stack; and
an exhaust channel in fluid communication with the second end of the exhaust pipe and secured to and formed as part of an underbody of the fuel cell vehicle, the exhaust channel further comprising a sealed chamber forming an exhaust tube; the exhaust channel configured to guide an exhaust vapor from the fuel cell vehicle to exit the exhaust channel into the atmosphere.

16. The fuel cell vehicle exhaust system of claim 15, wherein the exhaust tube is formed within an interior of the exhaust channel, wherein a portion of the exhaust tube is formed from an interior surface of the exhaust channel.

17. The fuel cell vehicle exhaust system of claim 15, wherein the exhaust tube extends along an entire length of the exhaust channel.

18. The fuel cell vehicle exhaust system of claim 15, wherein the exhaust channel is formed as a part of a rocker panel of the underbody of the fuel cell vehicle.

19. The fuel cell vehicle exhaust system of claim 15, wherein the exhaust channel is formed as a part of at least one of an A-pillar, a B-pillar and a C-pillar of the fuel cell vehicle.

20. The fuel cell vehicle exhaust system of claim 15, wherein the exhaust pipe is sealed to the exhaust channel.

* * * * *